United States Patent [19]

Hida et al.

[11] Patent Number: 4,683,320

[45] Date of Patent: Jul. 28, 1987

[54] NOVEL ORGANOPOLYSILOXANE, METHOD FOR THE PREPARATION THEREOF AND COMPOSITION CONTAINING THE SAME

[75] Inventors: Yoshinori Hida; Shohei Kozakai, both of Annaka, Japan

[73] Assignee: Shin-Etsu Chemical Co., Ltd., Tokyo, Japan

[21] Appl. No.: 878,002

[22] Filed: Jun. 24, 1986

[30] Foreign Application Priority Data

Jun. 26, 1985 [JP] Japan .................... 60-139743

[51] Int. Cl.$^4$ ................................. C07F 7/08
[52] U.S. Cl. ............................. 556/453; 556/456; 528/10; 528/12; 528/24; 528/32
[58] Field of Search ................... 556/453, 456; 204/159.13; 528/10, 12, 24, 32

[56] References Cited

U.S. PATENT DOCUMENTS

| | | | |
|---|---|---|---|
| 2,480,822 | 9/1949 | Hyde | 556/456 |
| 2,714,099 | 7/1955 | Weyenberg | 556/456 X |
| 3,183,209 | 5/1965 | Hartung et al. | 556/456 X |
| 3,249,581 | 5/1966 | Nelson | 556/453 X |
| 3,284,406 | 11/1966 | Nelson | 556/456 X |
| 3,843,601 | 10/1974 | Bruner | 556/456 X |
| 4,172,101 | 10/1979 | Getson | 556/456 X |

*Primary Examiner*—Paul F. Shaver
*Attorney, Agent, or Firm*—Hopgood, Calimafde, Kalil, Blaustein & Judlowe

[57] ABSTRACT

In the alkenyl-containing diorganopolysiloxane of the invention, the distribution of the alkenyl groups in the molecule is not random as in conventional alkenyl-containing diorganopolysiloxanes but each of at least three siloxane units linked to each of the terminal silicon atoms has an alkenyl, e.g. vinyl, group while at least six of the uninterruptedly linked siloxane units excepting the above mentioned alkenyl-containing units adjacent to the molecular chain ends are free from aliphatic unsaturation. A method for the preparation of the diorganopolysiloxane having the alkenyl groups in such a localized distribution is disclosed. When the diorganopolysiloxane is used as the principal ingredient of a curable organopolysiloxane composition as combined with a crosslinking agent, the composition, despite its relatively low viscosity, can give a cured rubber having markedly improved mechanical strengths.

7 Claims, 8 Drawing Figures

NOVEL ORGANOPOLYSILOXANE, METHOD FOR THE PREPARATION THEREOF AND COMPOSITION CONTAINING THE SAME

BACKGROUND OF THE INVENTION

The present invention relates to a novel organopolysiloxane not known in the prior art and not described in any literatures, a method for the preparation thereof and a curable composition containing the same as the principal component. More particularly, the invention relates to an organopolysiloxane composition capable of giving a cured rubbery elastomer having outstandingly high mechanical strengths and an organopolysiloxane as the principal ingredient of the composition as well as the method for the preparation of the organopolysiloxane.

As is well known curable organopolysiloxane compositions are widely used in a variety of applications in the fields of electric and electronic industries, automobiles and other machines, building constructions and others by virtue of the excellent heat and cold resistance, mold-releasability, electric insulation and other respects possessed by the cured products thereof. A problem in these curable organopolysiloxane compositions is the relatively low mechanical strengths of the cured products thereof so as to greatly limit the applicability of the compositions.

In this regard, compounding of a reinforcing filler such as a finely divided silica flour with the organopolysiloxane is effective though being accompanied by some disadvantages in other respects of increase in the consistency, deplastification and loss of tranparency. Several attempts have been proposed to improve the mechanical properties of cured organopolysiloxane compositions by modifying the chemical structure of the organopolysiloxane as the principal ingredient of the composition. For example, a proposal has been made for a so-called addition-type curable organopolysiloxane composition, in which crosslinks are formed between a diorganopolysiloxane having silicon-bonded vinyl groups and an organohydrogenpolysiloxane having hydrogen atoms directly bonded to the silicon atoms by the addition reaction therebetween, that the vinyl groups in the former polysiloxane are bonded to the diorganopolysiloxane molecules in an uneven distribution to be localized in particular positions. Such a method is not free from some disadvantages that the diorganopolysiloxane having vinyl groups in a localized distribution is expensive due to the difficulties in the preparation thereof since it is synthesized by the deamination reaction of a vinyl-containing diorganopolysiloxane terminated at both molecular chain ends each with a silanolic hydroxy group and a non-vinyl diorganopolysiloxane with an aminocontaining organosilicon compound having, in a molecule, two amino groups of the formula SiNR_2, R being a monovalent hydrocarbon group. Moreover, tne deamination reaction is hardly controllable in respect of the viscosity or degree of polymerization of the product which may be eventually gummy to give poor workability to the composition compounded therewith.

Several other methods are known for the preparation of such a diorganopolysiloxane containing vinyl groups in a localized distribution in the molecule including the method of equilibration between an organopolysiloxane of high vinyl content such as hexavinyl disiloxane and a cyclic poly(diorganosiloxane) in the presence of an alkali catalyst and a method in which a vinyl-containing organocyclotrisiloxane such as trivinyl trimethyl cyclotrisiloxane is polymerized with an organolithium compound or a diorganotrisiloxane such as a tetracyclotrisiloxane, which is a penta-coordinate silicon complex. The former method, however, is disadvantageous because the number of the vinyl groups in the resultant organopolysiloxane cannot exceed three in a molecule so that the cured product thereof is unsatisfactory in respect of the mechanical strengths. The latter method is also disadvantageous because a sufficiently large degree of polymerization of the organopolysiloxane product is obtained only after an unduly long reaction time and eventual condensation reaction and equilibration between the molecules as formed may result in a final product of which the degree of polymerization exceeds the target value. In this case, moreover, the polymerization reaction is greatly affected by the moisture so that a disadvantage is unavoidable because the process must be undertaken with an extreme care for excluding the moisture eventually entering the reaction mixture under a condition of dehydration.

SUMMARY OF THE INVENTION

Accordingly, the present invention has been completed as a result of the extensive investigations undertaken with an object to provide a curable organopolysiloxane composition free from the above described problems and disadvantages in the prior art compositions. Thus, the scope of the invention consists in compounding the composition with a diorganopolysiloxane which is a novel compound not known in the prior art.

The novel diorganopolysiloxane of the invention is represented by the general structural formula

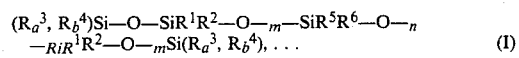

$$(R_a^3, R_b^4)Si\text{—}O\text{—}SiR^1R^2\text{—}O\text{—}_m\text{—}SiR^5R^6\text{—}O\text{—}_n$$
$$\text{—}_{RiR}^1R^2\text{—}O\text{—}_m Si(R_a^3, R_b^4), \ldots \qquad (I)$$

in which $R^1$ is an alkenyl group having 2 to 4 carbon atoms, $R^2$ and $R^3$ are each a monovalent hydrocarbon group, $R^4$, $R^5$ and $R^6$ are each a monovalent hydrocarbon group, a and b are each zero or a positive integer not exceeding 3 with the proviso that a +b is 3, m is a positive integer of at least 3 and n is a positive integer of at least 6. It is essential that the —SiR$^1$R$^2$—O— units included within the square brackets including m units are connected together in an uninterrupted sequence and bonded to the terminal $(R_a^3,R_b^4)$SiO— siloxy unit. It is further preferable that the groups denoted by $R^5$ and Rhu 6 are free from aliphatic unsaturation.

As is clear from the above given formula and definitions of the symbols, the diorganopolysiloxane has a feature that each of at least three diorganosiloxane units adjacently linked to each of the terminal triorganosiloxy groups has at least one alkenyl group denoted by $R^1$ bonded to the silicon atom.

The invention also provides a method for the preparation of the above defined novel diorganopolysiloxane. For example, the diorganopolysiloxane of the formula (I) can be prepared by reacting:

(1) an organopolysiloxane having, in a molecule, at least one siloxane unit of the formula (—SiR$^1$-R$^2$—O—)$_3$, in which $R^1$ and $R^2$ each have the same meaning as defined above and which is referred to as a tri(alkenylsiloxane) unit hereinbelow, at least one triorganosiloxy group of the formula $(R_a^3, R_b^4)$Si— and one and only one silylamine group of the formula SiNR$_2^7$ or silazane group Si-NR$^7$-Si in which R$^7$ is a hydrogen atom or a monovalent hydrocarbon group; and (2) a linear diorganopolysiloxane having a viscosity not exceeding 100,000 centipoise at 25° C. terminated at both molecular chain ends each with a silanolic hydroxy group as expressed by the general formula $$HO—SiR^5R^6—O—)_nH, \ldots \quad (II)$$

in which R$^5$, R$^6$ and n each have the same meaning as defined above.

The novel diorganopolysiloxane of the formula (I) is useful as a principal component combined with a crosslinking agent in a curable organopolysiloxane composition capable of giving a cured rubbery product having remarkably improved mechanical strengths.

DETAILED DESCRIPTION OF THE PREFERRED EMBODIMENTS

Figure 1:
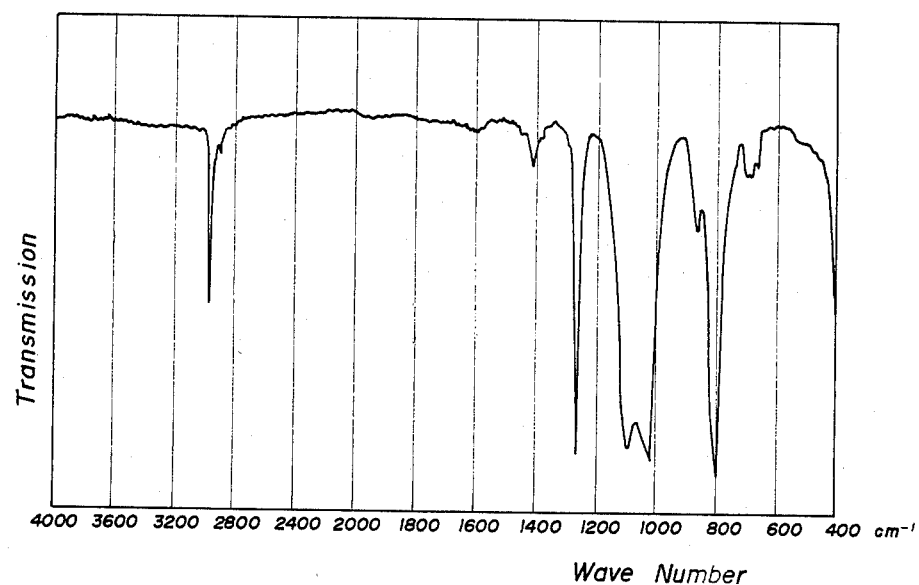
FIGS. 1 to 8 are each an infrared absorption spectrum of the organopolysiloxane prepared in Examples 1 to 8, respectively.

As is understood from the above given summarizing description, the novel diorganopolysiloxane of the invention can be prepared by the reaction of the silylamine- or silazane-containing organopolysiloxane as the reactant (1) and the hydroxy-terminated diorganopolysiloxane of the formula (II) as the reactant (2) so that a condensation reaction takes place preferentially between the silylamino or silazane groups in the reactant (1) and the terminal silanol groups in the reactant (2) to introduce the tri(alkenylsiloxane) unit into each end of the diorganopolysiloxane of the formula (II) without a large increase in the molecular weight of the organopolysiloxane.

In the general formula (I) representing the novel diorganopolysiloxane having a tri(alkenylsiloxane) unit at each of the molecular chain ends, the symbol R$^1$ is an alkenyl group having 2 to 4 carbon atoms such as vinyl and allyl groups or, preferably, a vinyl group. The symbols R$^2$ and R$^3$ are each the same group as R$^1$ or a monovalent hydrocarbon group exemplified by alkyl groups, e.g. methyl, ethyl, propyl and butyl groups, aryl groups, e.g. phenyl and tolyl groups, and cycloalkyl groups, e.g. cyclohexyl group, as well as those substituted groups obtained by replacing a part or all of the hydrogen atoms in the above named hydrocarbon groups with substituents such as halogen atoms and cyano groups, e.g. chloromethyl, 3,3,3-trifluoropropyl and cyanomethyl groups. R$^4$, R$^5$ and R$^6$ are each a monovalent hydrocarbon group similar to R$^3$ excepting R$^1$. It is preferable that at least 50% by moles of the groups denoted by R$^2$, R$^3$, R$^4$, R$^5$ and R$^6$ are methyl groups. The subscripts a and b are each zero or a positive integer not exceeding 3 with the proviso that a+b is 3, m is a positive integer of at least 3 and n is a positive integer of at least 6. It is essential that at least 6 uninterrupted sequence of the (—SiR$^5$R$^6$—O—) units in the —SiR$^5$R$^6$—O)$_n$ are free from aliphatic unsaturation.

Typical examples of the diorganopolysiloxanes in conformity with the general formula (I) include those expressed by the following structural formulas, denoting methyl, ethyl, vinyl, allyl, phenyl and 3,3,3-trifluoropropyl groups with the symbols of Me, Et, Vi, Al, Ph and Pf, respectively:

Me$_3$Si—O—SiMeVi—O]$_m$[SiMe$_2$—O]$_n$[SiMeVi—O]$_m$SiMe$_3$;

Me$_3$Si—O—SiMeAl—O]$_m$[SiMe$_2$—O]$_n$[SiMeAl—O]$_m$SiMe$_3$;

Me$_2$ViSi—O—SiMeVi—O]$_m$[SiMe$_2$—O]$_n$[SiMeVi—O]$_m$SiMe$_2$Vi;

Me$_3$Si—O'SieVi—O[$_m$[SiEt$_2$—O]$_n$[SiMeVi—O]$_m$SiMe$_3$;

Me$_3$Si—O—SiMeVi—O]$_m$[SiMePh—O]$_n$[SiMeVi—O]$_m$SiMe$_3$;

Me$_3$Si—O—SiMeVi—O$_m$[(—SiMe$_2$—O)$_p$(SiPh$_2$—O)$_q$]$_n$ SiMeVi—O]$_m$SiMe$_3$;

Me$_3$Si—O—SiMeVi—O]$_m$ SiMePf—)]$_n$[SiMeVi—O]$_m$SiMe$_3$;

Me$_3$Si—O—SiMeVi—O]$_m$[SiMeEt—O]$_n$ [SiMeVi—O]$_m$ SiMe$_3$;

and

Me$_3$Si—O—SiMeVi—$_m$ [(—SiMeEt—O)$_p$ (SiPh$_2$—O)$_q$ —SiMe$_2$—O)$_r$]$_n$ [SiMeVi—O]$_m$ SiMe$_3$, in which m and n each have the same meaning as defined above and p, q and r are each a positive integer.

Each of the diorganopolysiloxanes expressed by the above given formulas can be synthesized according to the general method by the reaction of the reactants (1) and (2) described before by suitably selecting the kind or combination of the organic groups denoted by the symbols R$^1$ to R$^6$. The reactant (1) is a silylamine- or silazane-containing organopolysiloxane and some of the examples thereof include those expressed by the following formulas:

R$^3$R$^4$Si—O—SiR$^1$R$^2$)$_3$]$_m$ [O—SiR$_2^2$)$_3$]$_n$NR$_2^7$;

{R$_3^4$Si—O—SiR$^1$R$^2$)$_3$]$_m$O—SiR$_2^2$)$_3$]$_n$}$_2$NR$^7$;

and

R$_3^4$Si—O—SiR$^1$R$^2$—O)$_3$]$_m$—SiR$_2^2$—O)$_3$]$_n$SiR$_2^2$—NR$_2^7$, in which m and n each have the same meaning as defined above.

The above described amino-substitued organopolysiloxanes can be prepared in several different ways. For example, an alkenyl-containing cyclic organopolysiloxane, e.g. cyclic trisiloxane, is subjected to the ring-opening polymerization reaction in the presence of a lithium amide compound expressed by the formula LiNR$_2^7$, in which R$^7$, has the meaning as defined above. Alternatively, the cyclic organopolysiloxane, a trialkyl silanol and a penta-coordinate organosilicon compound are reacted to give a linear diorganopolysiloxane terminated only at one molecular chain end with a silanolic hydroxy group, which is then reacted with an excess amount of a diorganodiaminosilane of the formula R$_2^2$Si(NR$_2^7$)$_2$, in which R$^2$ and R$^7$ each have the same meaning as defined above.

The reactant (2) to be reacted with the above described reactant (1) is a diorganopolysiloxane terminated at both molecular chain ends each with a silanolic hydroxy group as represented by the general formula (II). It is preferable that the reactant (2) has a relatively low viscosity of 100,000 centipoise or below at 25° C. Such a hydroxyterminated diorganopolysiloxane is well known in the art of silicones and can readily be prepared by the ring-opening polymerization of a cyclic diorganopolysiloxane such as octamethyl cyclotetrasiloxane.

The reaction between the above described reactants (1) and (2) can readily proceed even at room temperature merely by blending them together uniformly so that no particular problems are encountered in performing the reaction. The mixing ratio of the reactants (1) and (2) should theoretically be 1:1 by moles calculated for the amino or silazane groups in the reactant (1) and the terminal hydroxy groups in the reactant (2). The molar ratio of the former groups to the latter hydroxy groups can be in the range from 0.8 to 1.5 from the practical standpoint.

If desired to improve the efficiency of the reaction, the reaction can be performed by dissolving the reactants in a suitable organic solvent. Usable organic solvents include hydrocarbon solvents, e.g. toluene, xylene and n-hexane, ethers, e.g. tetrahydrofuran and dioxane, and chlorinated hydrocarbon solvents, e.g. dichloromethane and dichloroethane. The reaction temperature is not particularly limitative although it is optional to accelerate the reaction by heating the reaction mixture at a temperature of up to 150° C. in consideration of the reactivity of the amino groups in the reactant (1) which depends on the structure of the compound.

Since the reactant (1) has only one amino or silazane group in a molecule, the molecular weight of the resultant organopolysiloxane is determined basically by the molecular weight of the reactant (2). In other words, the organopolysiloxane product obtained by the reaction of the reactants (1) and (2) has a viscosity not greatly different from the viscosity of the reactant (2). Therefore, the reactant (2) should have a low viscosity when the desired organopolysiloxane product should be a liquid having a relatively low viscosity.

The above described diorganopolysiloxane is useful as a principal component of a curable organopolysiloxane composition capable of giving a cured rubbery product having markedly improved mechanical strengths. It is essential that the composition should contain a crosslinking agent for the diorganopolysiloxane although the type of the crosslinking agent is not particularly limitative provided that crosslinks are formed between the alkenyl groups in the diorganopolysiloxane. A first class of such a crosslinking agent includes an organosilane or organopolysiloxane having, in a molecule, at least two hydrogen atoms directly bonded to the silicon atom or atoms. Such a silicon-bonded hydrogen atom pertains to the addition reaction or so-called hydrosilation reaction with the alkenyl group in the presence of a catalytic amount of a platinum compound as the catalyst. A second class of the crosslinking agent includes an organosilane or organopolysiloxane compound having, in a molecule, at least two mercaptoalkyl groups. An addition reaction takes place between such a mercaptoalkyl group and the alkenyl group in the inventive diorganopolysiloxane when promoted by a promotor which may be a photosensitizer such as benzophenone and benzoin isobutyl ether or a metallocene compound such as ferrocene and cobaltocene. Further, a third class of the crosslinking agent is an organic peroxide which is effective to form crosslinks between the alkenyl groups. Exemplary of suitable organic peroxides are benzoyl peroxide, dicumyl peroxide, 2,5-dimethyl-2,5-di(tert-butyl peroxy) hexane, di-tert-butyl peroxide, methylcyclohexanone peroxide, tert-butyl hydroperoxide, tert-butyl peroxy benzoate, tert-butyl peroxy iropropyl carbonate and the like.

It is of course optional that the curable organopolysiloxane composition of the invention is futher admixed, according to need, with various kinds of additives conventionally used in silicone rubbers including fillers, e.g. finely divided fumed and precipitated silica flours and calcium carbonate, pigments for coloring, e.g. titanium dioxide and carbon black, thermal stability improvers, reaction moderators, flow controlling agents, adhesion aids and the like though each in a limited amount.

The diorganopolysiloxane as the principal ingredient of the curable organopolysiloxane composition has such a very unique structure that the alkenyl groups are contained therein in a localized manner at the molecular chain ends so that, despite the relatively low molecular weight thereof, the cured rubbery product of the inventive curable organopolysiloxane has markedly improved mechanical strengths. For example, the tensile strength of the cured product can be as high as 40 $kg/cm^2$ or higher. When the diorganopolysiloxane is a liquid having a relatively low viscosity, the curable organopolysiloxane composition is also liquid with good workability so that the composition can be used advantageously in a variety of applications as an insulating potting and coating material of electric and electronic parts and devices, adhesive and sealing agent in the building construction works, coating agent of various articles of metals, glasses and ceramics, mold release agent in the shaping works of plastics, coating material on optical fibers for optical communication and so on.

In the following, examples are given to illustrate the novel diorganopolysiloxane and a method for the preparation thereof as well as the curable organopolysiloxane composition according to the invention in more detail. In the following description, the expression of "parts" always refers to "parts by weight" and the values of viscosity are all those obtained by the measurement at 25° C.

EXAMPLE 1

An alkenyl-containing aminosiloxane was prepared in the following manner. Thus, a mixture composed of 187.9 g of a n-hexane solution containing 15% by weight (0.42 mole) of n-butyl lithium n-BuLi and 140 ml of n-hexane was chilled and kept at a temperature of 5° C. or below, into which 29.0 g of dimethyl amine $HNMe_2$ in a gaseous form were blown. The precipitates formed in the reaction mixture were collected and dried followed by the addition of 180 ml of distilled tetrahydrofuran to dissolve the precipitates. The solution was kept at 30° C. and dry nitrogen gas was bubbled thereinto for 30 minutes to remove the excess amount of the dimethyl amine dissolved therein.

Then, 309.6 g (1.2 moles) of 1,3,5-trimethyl-1,3,5-tivinyl cyclotrisiloxane were added to the solution kept at 5° C. or below and the mixture was agitated at room temperature for 12 hours. Thereafter, the mixture was again chilled to 5° C. and 54.7 g (0.5 mole) of trimethyl chlorosilane was added thereto dropwise followed by agitation of the mixture at room temperature for 1 hour after completion of the dropwise addition of the silane and then heating of the mixture under reflux for additional 1 hour. The mixture was then freed from low-boiling constituents by distillation under a reduced pressure of 20 mmHg at 100° C. followed by filtration of the remaining liquid to give a light yellow, clear liquid.

Since the reaction should proceed according to the reaction equations:

n—BuLi + HNMe₂ → LiNMe₂ + n—BuH;

LiNMe₂ + n(—SiMeVi—O—)₃ → Me₂N—SiMeVi—)₃ₙ Li; and

Me₂N—SiMeVi—O)₃ₙ Li + Me₃SiCl → Me₂N—SiMeVi—O)₃ₙ SiMe₃, the resultant reaction product obtained by using about 3 moles of the cyclic trisiloxane per mole of butyl lithium should be a vinyl-containing aminosiloxane compound of the average formula Me₂N—SiMeVi—O)₉ SiMe₃.

In the next place, the thus obtained vinyl-containing aminosiloxane compound was used for the preparation of a diorganopolysiloxane having vinyl groups in a localized distribution at the molecular chain ends. Thus, 100 g of a dimethylpolysiloxane having a viscosity of 5,000 centistokes and containing 0.00675 mole/100 g of silanolic hydroxy groups were heated at 120° to 150° C. for 2 hours under a stream of nitrogen gas to be dehydrated. After cooling to 40° C. or below, the dimethylpolysiloxane was admixed with 6.31 g of the above prepared alkenyl-containing aminosiloxane compound and the mixture was agitated first at room temperature for 12 hours and then at 100° C. for 3 hours followed by stripping of low volatile matters at 160° to 180° C. under reduced pressure to give an organopolysiloxane compound having a viscosity of 5,900 centistokes, which is referred to as the Siloxane-I hereinbelow. Infrared absorption spectral and NMR absorption spectral analyses of this Siloxane-I supported that it had a molecular structure expressed by the formula Me₃Si—(—O—SiMeVi)₉ —O—SiMe₂)₄₀₀ (—O—SiMeVi—)₉O—SiMe₃, the 9( O SiMeVi ) units at each molecular chain end forming an uninterrputed sequence. The infrared absorption spectrum of the Siloxane-I is shown in FIG. 1 and the result of the NMR analysis was:

δ0.04 assignable to the hydrogen atoms in the Si-Me groups; and

δ5.3 to 6.6 assignable to the hydrogen atoms in the Si-Vi groups.

The thus prepared Siloxane-I was admixed with different crosslinking agents to give three curable organopolysiloxane compositions, referred to as the Compositions 1, 2 and 3 hereinbelow, according to the formulations shown below.

| Composition 1: | |
|---|---|
| Siloxane-I | 100 parts |
| Methylhydrogenpolysiloxane having 0.527 mole/100 g of silicon-bonded hydrogen atoms | 13.1 parts |
| n-Hexyl alcohol solution of chloroplatinic acid in a concentration of 2% by weight as platinum | 0.1 part |
| Composition 2: | |
| Siloxane-I | 100 parts |
| Methylpolysiloxane having 0.0636 mole/100 g of 3-mercaptopropyl groups | 90.4 parts |
| Benzoin isobutyl ether | 1.9 parts |
| Composition 3: | |
| Siloxane-I | 100 parts |
| 2,5-Dimethyl-2,5-di(tert-butyl peroxy) hexane | 1 part |

The Composition 1 prepared according to the above shown formulation was shaped into a sheet of 2 mm thickness which was heated at 150° C. for 3 hours to give a cured rubber sheet, referred to as the Sheet-I hereinbelow. The Composition 2 was also shaped into a sheet of 1 mm thickness which was irradiated for 1 second with ultraviolet light coming from a high-pressure mercury lamp of 80 watts/cm output at a distance of 10 cm to give a cured rubber sheet, referred to as the Sheet-II hereinbelow. Further, the Composition 3 was shaped into a sheet of 2 mm thickness which was heated at 170° C. for 3 minutes to give a cured rubber sheet, referred to as the Sheet-III hereinbelow. Each of the Sheets-I, -II and -III was subjected to the measurement of the mechanical properties to give the results shown in Table 1 below.

TABLE 1

| Sheet | I | II | III |
|---|---|---|---|
| Hardness, JIS | 35 | 31 | 27 |
| Tensile strength, kg/cm² | 25 | 14 | 7 |
| Ultimate elongation, % | 125 | 135 | 130 |

EXAMPLE 2

A liquid diorganopolysiloxane, referred to as the Siloxane-II hereinbelow, was prepared in substantially the same manner as in Example 1 by the reaction of 100 g of a silanol-terminated dimethylpolysiloxane having a viscosity of 1,500 centistokes and containing 0.0115 mole/100 g of silanolic terminal hydroxy groups as expressed by the formula HO—SiMe₂—O)₂₃₅ H and 10.7 g of the alkenyl-containing aminosiloxane compound prepared in Example 1. The resultant diorganopolysiloxane had a viscosity of 1,850 centistokes and could be identified by the infrared and NMR absorption spectral analyses to be a compound expressed by the following structural formula:

Me₃SiO—SiMeVi)₉ (O—SiMe₂)₂₃₅ (—O—SiMeVi)₉ O—SiMe₃.

Figure 2:
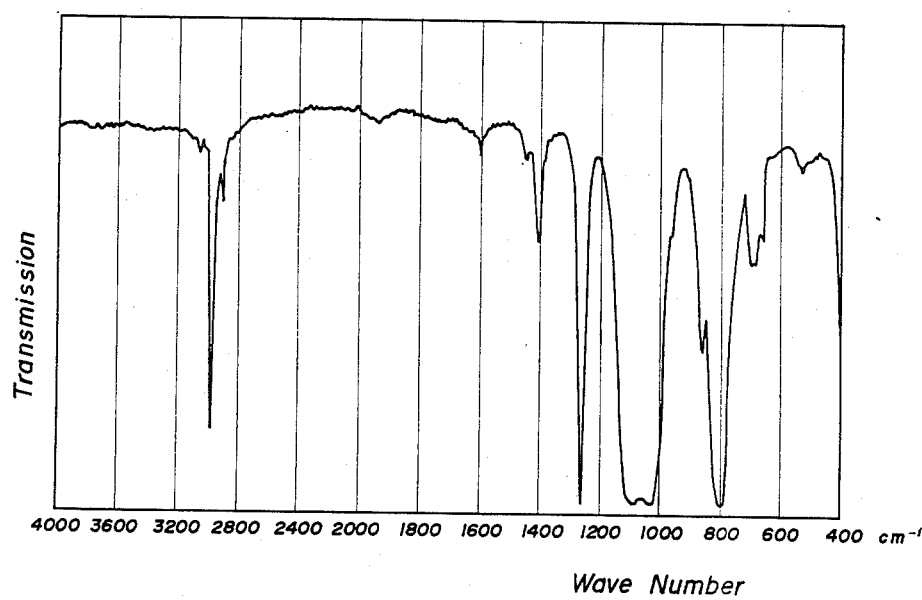

The infrared absorption spectrum of the Siloxane-II is shown in FIG. 2 and the result of the NMR analysis was: δ0.04 assignable to the hydrogen atoms in the Si—Me groups; and δ5.3 to 6.6 assignable to the hydrogen atoms in the Si—Vi groups.

The thus prepared Siloxane-II was admixed with different crosslinking agents to give three curable organopolysiloxane compositions, referred to as the Compositions 4, 5 and 6 hereinbelow, according to the formulations shown below.

| Composition 4: | |
|---|---|
| Siloxane-II | 100 parts |
| Methylhydrogenpolysiloxane having 0.527 mole/100 g of silicon-bonded hydrogen atoms | 21.5 parts |
| n-Hexyl alcohol solution of chloroplatinic acid in a concentration of 2% by weight as platinum | 0.1 part |
| Composition 5: | |
| Siloxane-II | 100 parts |
| Methylpolysiloxane having 0.063 mole/100 g of 3-mercaptopropyl | 148.2 parts |

| -continued | |
|---|---|
| groups | |
| Benzoin isobutyl ether | 2.48 parts |
| Composition 6: | |
| Siloxane-II | 100 parts |
| 2,5-Dimethyl-2,5-di(tert-butyl peroxy) hexane | 1 part |

The Composition 4 prepared according to the above shown formulation was shaped into a sheet of 2 mm thickness which was heated at 150° C. for 3 hours to give a cured rubber sheet, referred to as the Sheet-IV hereinbelow. The Composition 5 was also shaped into a sheet of 1 mm thickness which was irradiated for 1 second with ultraviolet light coming from a high-pressure mercury lamp of 80 watts/cm output at a distance of 10 cm to give a cured rubber sheet, referred to as the Sheet-V hereinbelow. Further, the Composition 6 was shaped into a sheet of 2 mm thickness which was heated at 170° C. for 3 minutes to give a cured rubber sheet, referred to as the Sheet-VI hereinbelow. Each of the Sheets-IV, -V and -VI was subjected to the measurement of the mechanical properties to give the results shown in Table 2 below.

TABLE 2

| Sheet | IV | V | VI |
|---|---|---|---|
| Hardness, JIS | 57 | 38 | 41 |
| Tensile strength, kg/cm$^2$ | 48 | 14 | 11 |
| Ultimate elongation, % | 80 | 85 | 100 |

EXAMPLE 3

A liquid diorganopolysiloxane, referred to as the Siloxane-III hereinbelow, was prepared in substantially the same manner as in Example 1 by the reaction of 100 g of a silanol-terminated dimethylpolysiloxane having a viscosity of 2,000 centistokes and containing 0.0045 mole/100 g of silanolic terminal hydroxy groups as expressed by the formula HO—SiMe$_2$—O)$_{600}$ H and 4.21 g of the alkenyl-containing aminosiloxane compound prepared in Example 1. The resultant diorganopolysiloxane had a viscosity of 23,000 centistokes and could be identified by the infrared and NMR absorption spectral analyses to be a compound expressed by the following structural formula:

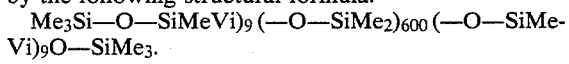
Me$_3$Si—O—SiMeVi)$_9$ (—O—SiMe$_2$)$_{600}$ (—O—SiMeVi)$_9$O—SiMe$_3$.

Figure 3:
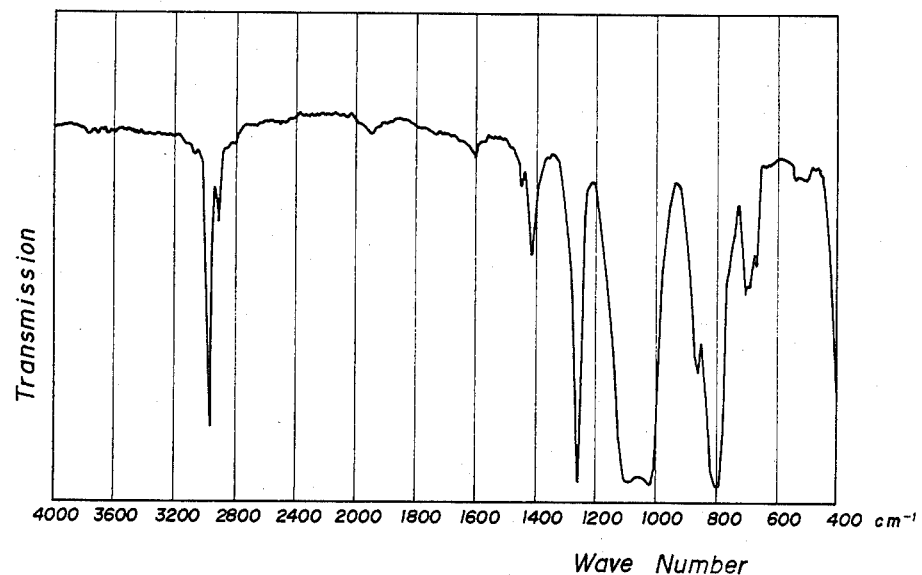

The infrared absorption apectrum of the Siloxane-III is shown in FIG. 3 and the result of the NMR analysis was:

δ 0.04 assignable to the hydrogen atoms in the Si—Me groups; and

δ 5.3 to 6.6 assignable to the hydrogen atoms in the Si—Vi groups.

The thus prepared Siloxane-III was admixed with different crosslinking agents to give three curable organopolysiloxane compositions, referred to as the Compositions 7, 8 and 9 hereinbelow, according to the formulations shown below.

| Composition 7: | |
|---|---|
| Siloxane-III | 100 parts |
| Methylhydrogenpolysiloxane having 0.527 mole/100 g of silicon-bonded hydrogen atoms | 8.9 parts |
| n-Hexyl alcohol solution of chloro- | 0.1 part |

| -continued | |
|---|---|
| platinic acid in a concentration of 2% by weight as platinum | |
| Composition 8: | |
| Siloxane-III | |
| Methylpolysiloxane having 0.0636 mole/100 g of 3-mercaptopropyl groups | 61.4 parts |
| Benzoin isobutyl ether | 1.61 parts |
| Composition 9: | |
| Siloxane-III | 100 parts |
| 2,5-Dimethyl-2,5-di(tert-butyl peroxy) hexane | 1 part |

The Composition 7 prepared according to the above shown formulation was shaped into a sheet of 2 mm thickness which was heated at 150° C. for 3 hours to give a cured rubber sheet, referred to as the Sheet-VII hfereinbelow. The Composision 8 was also shaped into a sheet of 1 mm thickness which was irradiated for 1 second with ultraviolet light coming from a high-pressure mercury lamp of 80 watts/cm output at a distance of 10 cm to give a cured rubber sheet, referred to as the Sheet-VIII hereinbelow. Further, the Composition 9 was shaped into a sheet of 2 mm thickness which was heated at 170° C. for 3 minutes to give a cured rubber sheet, referred to as the Sheet-IX hereinbelow. Each of the Sheets-VII, -VIII and -IX was subjected to the measurement of the mechanical properties to give the results shown in Table 3 below.

TABLE 3

| Sheet | VII | VIII | IX |
|---|---|---|---|
| Hardness, JIS | 26 | 28 | 25 |
| Tensile strength, kg/cm$^2$ | 19 | 46 | 6 |
| Ultimate elongation, % | 220 | 190 | 179 |

EXAMPLE 4

An alkenyl-containing aminosiloxane as expressed by the formula Me$_3$Si—O—SiMeVi)$_{15}$ NME$_2$ was prepared in substanliaIly the same manner as in Example 1 by the reaction of 187.9 g of a n-hexane solution containing 15% by weight (0.42 mole) of n-butyl lithium, 250 ml of n-hexane, 29.0 g of dimethyl amine, 180 ml of distilled tetrahydrofuran and 516 g (2 moles) of 1,3,5-trimethyl-1,3,5-trivinyl cyclotrisiloxane.

A liquid diorganopolysiloxane, referred to as the Siloxane-IV hereinbelow, was prepared in substantially the same manner as in Example 1 by the reaction of 100 g of a silanol-terminated dimethylpolysiloxane having a viscosity of 5,000 centistokes and containing 0.00675 mole/100 g of silanolic terminal hydroxy groups as expressed by the formula HO—SiMe$_2$—O)$_{400}$ H and 9.97 g of the alkenyl-containing aminosiloxane compound prepared above. The resultant diorganopolysiloxane had a viscosity of 6,000 centistokes and could be identified by the infrared and NMR absorption spectral analyses to be a compound expressed by the following structural formula:

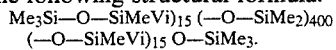
Me$_3$Si—O—SiMeVi)$_{15}$ (—O—SiMe$_2$)$_{400}$ (—O—SiMeVi)$_{15}$ O—SiMe$_3$.

Figure 4:
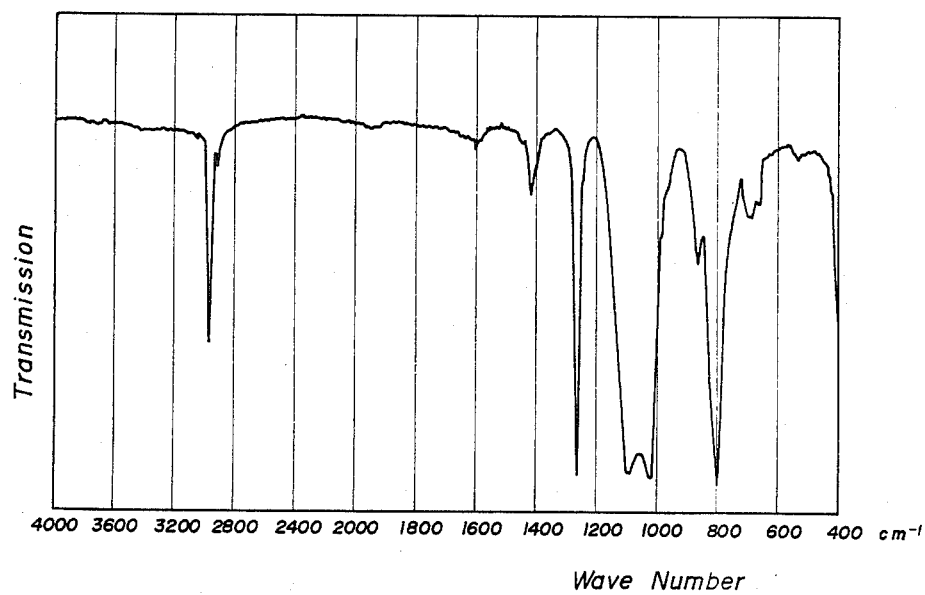

The infrared absorption spectrum of the Siloxane-IV is shown in FIG. 4 and the result of the NMR analysis was:

δ0.04 assignable to the hydrogen atoms in the Si—Me groups; and

δ 5.3 to 6.6 assignable to the hydrogen atoms in the Si—Vi groups.

The thus prepared Siloxane-IV was admixed with two different crosslinking agents to give two curable organopolysiloxane compositions, referred to as the Compositions 10 and 11 hereinbelow, according to the formulations shown below.

| Composition 10: | |
|---|---|
| Siloxane-IV | 100 parts |
| Methylhydrogenpolysiloxane having 0.527 mole/100 g of silicon-bonded hydrogen atoms | 21.6 parts |
| n-Hexyl alcohol solution of chloroplatinic acid in a concentration of 2% by weight as platinum | 0.1 part |
| Composition 11: | |
| Siloxane-IV | 100 parts |
| Methylpolysiloxane having 0.0636 mole/100 g of 3-mercaptopropyl groups | 148.1 parts |
| Benzoin isobutyl ether | 2.48 parts |

The Composition 10 prepared according to the above shown formulation was shaped into a sheet of 2 mm thickness which was heated at 150° C. for 3 hours to give a cured rubber sheet, referred to as the Sheet-X hereinbelow. The Composition 11 was also shaped into a sheet of 1 mm thickness which was irradiated for 1 second with ultraviolet light coming from a high-pressure mercury lamp of 80 watts/cm output at a distance of 10 cm to give a cured rubber sheet, referred to as the Sheet-XI hereinbelow. Each of the Sheets-X and -XI was subjected to the measurement of the mechanical properties to give the results shown in Table 4 below.

TABLE 4

| Sheet | X | XI |
|---|---|---|
| Hardness, JIS | 50 | 37 |
| Tensile strength, kg/cm$^2$ | 42 | 41 |
| Ultimate elongation, % | 120 | 120 |

COMPARATIVE EXAMPLE 1

A liquid diorganopolysiloxane, referred to as the Siloxane-V hereinbelow, was prepared in the following manner. Thus, a mixture composed of 111 g (0.5 mole) of hexamethyl cyclotrisiloxane, 100 ml of dried tetrahydrofuran and 14.63 g of benzene solution containing 0.000257 mole/g of dilithium diphenylsilanolate was heated for 2 hours with agitation under reflux of the solvent. Then, 5.82 g (0.0226 mole) of 1,3,5-trimethyl-1,3,5-tivinyl cyclotrisiloxane were added to the solution and the mixture was heated under reflux for 2 hours.

Thereafter, the mixture was cooled to room temperature and 1.63 g of trimethyl chlorosilane were added thereto dropwise followed by agitation of the mixture for 2 hours. The mixture was then freed from low-boiling constituents by distillation under a reduced pressure of 2 mm Hg at 140 to 170° C. followed by filtration of the remaining liquid to give an alkenyl-containing diorganopolysiloxane compound having a viscosity of 98,000 centistokes and containing 0.00204 mole/100 g of vinyl groups.

The thus prepared Siloxane-V was admixed with crosslinking agents to give a curable organopolysiloxane composition, referred to as the Composition 12 hereinbelow, according to the formulation shown below.

| Composition 12: | |
|---|---|
| Siloxane-V | 100 parts |
| Methylhydrogenpolysiloxane having 0.527 mole/100 g of silicon-bonded hydrogen atoms | 4.6 parts |
| n-Hexyl alcohol solution of chloroplatinic acid in a concentration of 2% by weight as platinum | 0.1 part |

The Composition 12 prepared according to the above shown formulation was shaped into a sheet of 2 mm thickness which was heated at 150° C. for 3 hours to give a cured rubber sheet, referred to as the Sheet-XII hereinbelow, and subjected to the measurement of the mechanical properties to give the following results: hardness, JIS 20; tensile strength 3 kg/cm$^2$; and ultimate elongation 70%.

COMPARATIVE EXAMPLE 2

An alkenyl-containing organopolysiloxane, referred to as the Siloxane-VI hereinbelow, was prepared, according to the known alkali-catalyzed equilibration method, by the reaction of 148 g (0.5 mole) of octamethyl cyclotetrasiloxane, 7.74 g (0.025 mole) of tetravinyl tetramethyl cyclotetrasiloxane and 0.88 g (0.005 mole) of hexamethyldisiloxane. The Siloxane-VI obtained above contained the same molar amount of vinyl groups as the Siloxane-I and was expressed by the following formula:

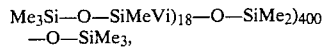

$$Me_3Si—O—SiMeVi)_{18}—O—SiMe_2)_{400}$$
$$—O—SiMe_3,$$

but the methyl vinyl siloxane units —O—SiMeVi— were distributed at random in the molecular chains.

The thus prepared Siloxane-VI was admixed with crosslinking agents to give a curable organopolysiloxane composition, referred to as the Composition 13 hereinbelow, according to the formulation shown below.

| Composition 13: | |
|---|---|
| Siloxane-VI | 100 parts |
| Methylhydrogenpolysiloxane having 0.527 mole/100 g of silicon-bonded hydrogen atoms | 13.1 parts |
| n-Hexyl alcohol solution of chloroplatinic acid in a concentration of 2% by weight as platinum | 0.1 part |

The Composition 13 prepared according to the above shown formulation was shaped into a sheet of 2 mm thickness which was heated at 150° C. for 3 hours to give a cured rubber sheet, referred to as the Sheet-XIII hereinbelow, and subjected to the measurement of the mechanical properties to give only hardness, JIS, of 52 while the Sheet-XIII was so fragile that tensile strength and ultimate elongation could not be measured.

COMPARATIVE EXAMPLE 3

An alkenyl-containing organopolysiloxane as expressed by the formula $Vi_3Si—O—SiMe_2)_{400}—O—SiVi_3$, referred to as the Siloxane-VII hereinbelow, was prepared, according to the known alkali-catalyzed equilibration method, by the reaction of hexavinyldisiloxane and a mixture of cyclic oligomers composed of dimethylsiloxane units.

The thus prepared Siloxane-VII was admixed with different crosslinking agents to give two curable organopolysiloxane compositions, referred to as the Compositions 14 and 15 hereinbelow, according to the formulations shown below.

| Composition 14: | |
|---|---|
| Siloxane-VII | 100 parts |
| Methylhydrogenpolysiloxane having 0.527 mole/100 g of silicon-bonded hydrogen atoms | 3.81 parts |
| n-Hexyl alcohol solution of chloroplatinic acid in a concentration of 2% by weight as platinum | 0.1 part |
| Composition 15: | |
| Siloxane-VII | 100 parts |
| Methylpolysiloxane having 0.0636 mole/100 g of 3-mercaptopropyl groups | 31.6 parts |
| Benzoin isobutyl ether | 1.32 parts |

The Composition 14 prepared according to the above shown formulation was shaped into a sheet of 2 mm thickness which was heated at 150° C. for 3 hours to give a cured rubber sheet, referred to as the Sheet-XIV hereinbelow. The Composition 15 was also shaped into a sheet of 1 mm thickness which was irradiated for 1 second with ultraviolet light coming from a high-pressure mercury lamp of 80 watts/cm output at a distance of 10 cm to give a cured rubber sheet, referred to as the Sheet-XV hereinbelow. Each of the Sheets-XIV and -XV was subjected to the measurement of the mechanical properties to give the results shown in Table 5 below.

TABLE 5

| Sheet | XIV | XV |
|---|---|---|
| Hardness, JIS | 29 | 26 |
| Tensile strength, kg/cm$^2$ | 10 | 4 |
| Ultimate elongation, % | 120 | 120 |

EXAMPLE 5

A mixture of alkenyl-containing aminosiloxane and siloxazane compounds were prepared in the following manner. Thus, a mixture composed of 38.7 g (0.15 mole) of 1,3,5-trimethyl-1,3,5-trivinyl cyclotrisiloxane, 4.5 g of (0.05 mole) of trimethylsilanol, 2.15 g of acetonitrile and 0.005 g of a catalytic organosilane compound expressed by the formula

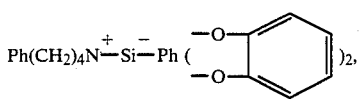

was heated and kept at a temperature of 60° C. for 90 minutes under agitation. The reaction mixture was added dropwise into a mixture of 38.76 g (0.3 mole) of dimethyldichlorosilane and 80 ml of n-hexane containing 5.1 g (0.05 mole) of triethylamine followed by agitation of the mixture at room temperature for 8 hours after completion of the dropwise addition of the reaction mixture. The mixture was then freed from low-boiling constituents by distillation at 100° C. under reduced pressure followed by the addition of 80 ml of fresh n-hexane and 4.0 g of ammonia in a gaseous form were blown thereinto. The mixture was kept at 30° C. and dry nitrogen gas was bubbled thereinto for 30 minutes to remove the excess amount of the ammonia dissolved therein. The mixture was cooled and filtered to give a light yellow, clear liquid, which was diluted by adding n-hexane to give a content of non-volatile matter of 30% after 30 minutes at 100° C.

Since the reaction should proceed according to the reaction equations:

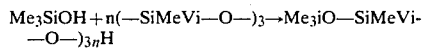

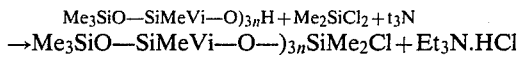

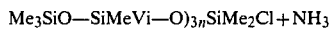
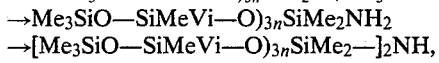

the resultant reaction product should be a mixture of a vinyl-containing amino-terminated organopolysiloxane and a siloxazane compound of the average formulas

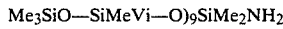
and
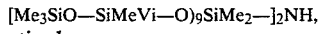

respectively.

An alkenyl-containing organopolysiloxane was prepared in the following manner. Thus, 100 g of a dimethylpolysiloxane having a viscosity of 5,000 centistokes and containing 0.00675 mole/100 g of silanolic hydroxy groups as expressed by the formula HO—SiMe$_2$—O)$_{400}$ H and 6.11 g of the above prepared mixture of alkenyl-containing aminosiloxane and siloxazane compounds were reacted in substantially the same manner as in Example 1 to give an organopolysiloxane compound having a viscosity of 5,600 centistokes, which is referred to as the Siloxane-VIII hereinbelow. Infrared absorption spectral and NMR absorption spectral analyses of this Siloxane-VIII supported that it had a molecular structure expressed by the formula

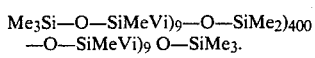

Figure 5:
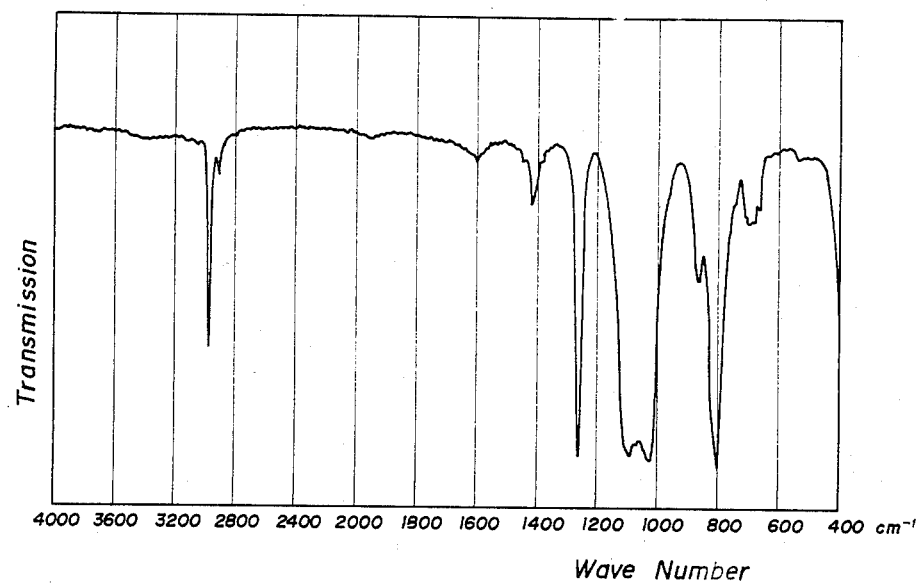

The infrared absorption spectrum of the Siloxane-VIII is shown in FIG. 5 and the result of the NMR analysis was:

δ0.04 assignable to the hydrogen atoms in the Si—Me groups; and

δ5.3 to 6.6 assignable to the hydrogen atoms in the Si—Vi groups.

The thus prepared Siloxane-VIII was admixed with crosslinking agents to give a curable organopolysiloxane composition, referred to as the Composition 16 hereinbelow, according to the formulation shown below.

| Composition 16: | |
|---|---|
| Siloxane-VIII | 100 parts |
| Methylhydrogenpolysiloxane having 0.527 mole/100 g of silicon-bonded hydrogen atoms | 13.1 parts |
| n-Hexyl alcohol solution of chloroplatinic acid in a concentration of 2% by weight as platinum | 0.1 part |

The Composition 16 prepared according to the above shown formulation was shaped into a sheet of 2 mm thickness which was heated at 150° C. for 3 hours to give a cured rubber sheet, referred to as the Sheet-XVI hereinbelow, and it was subjected to the measurement of the mechanical properties to give the following results: hardness, JIS 37; tensile strength 23 kg/cm²; and ultimate elongation 120%.

An alkenyl-containing aminosiloxane as expressed by the formula Me₃Si—O—SiMeAl)₉ NMe₂ was prepared in substantially the same manner as in Example 1 by the reaction of 187.9 g of a n-hexane solution containing 15% by weight (0.42 mole) of n-butyl lithium, 250 ml of n-hexane, 29.0 g of dimethyl amine, 180 ml of distilled tetrahydrofuran and 360.0 g (1.2 moles) of 1,3,5-trimethyl-1,3,5-triallyl cyclotri- siloxane.

A liquid diorganopolysiloxane, referred to as the Siloxane-IX hereinbelow, was prepared in substantially the same manner as in Example 1 by the reaction of 100 g of a silanol-terminated dimethylpolysiloxane having a viscosity of 5,000 centistokes and containing 0.00675 mole/100 g of silanolic terminal hydroxy groups as expressed by the formula HO—SiMe₂O)₄₀₀ H and 7.21 g of the alkenyl-containing aminosiloxane compound prepared above. The resultant diorganopolysiloxane had a viscosity of 6,000 centistokes and could be identified by the infrared and NMR absorption spectral analyses to be a compound expressed by the following structural formula:

Me₃Si—O—SiMeAl)₉ (—O—SiMe₂ ₄₀₀
—O—SiMeAl)₉ O—SiMe₃.

Figure 6:
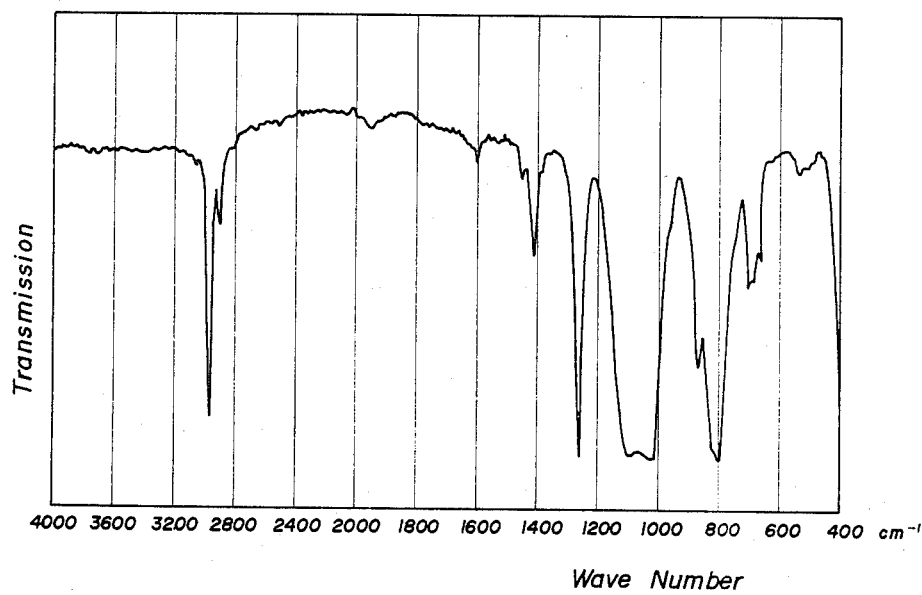

The infrared absorption spectrum of the Siloxane-IX is shown in FIG. 6 and the result of the NMR analysis was:
δ6 0.04 assignable to the hydrogen atoms in the Si—Me groups;
δ6 4.6 to 6.3 assignable to the hydrogen atoms of the allyl group in the Si—Al groups; and
δ1.4 to 1.9 assignable to the hydrogen atoms of methylene group in the Si—Al groups.

The thus prepared Siloxane-IX was admixed with crosslinking agents to give a curable organopolysiloxane composition, referred to as the Composition 17 hereinbelow, according to the formulation shown below.

| Composition 17: | |
|---|---|
| Siloxane-IX | 100 parts |
| Methylhydrogenpolysiloxane having 0.527 mole/100 g of silicon-bonded hydrogen atoms | 13.1 parts |
| n-Hexyl alcohol solution of chloroplatinic acid in a concentration of 2% by weight as platinum | 0.1 part |

The Composition 17 prepared according to the above shown formulation was shaped into a sheet of 2 mm thickness which was heated at 150° C. for 3 hours to give a cured rubber sheet, referred to as the Sheet-XVII hereinbelow, ahd it was subjected to the measurement of the mechanical properties to give the following results: hardness, JIS 36; tensile strength 25 kg/cm²; and ultimate elongation 123%.

EXAMPLE 7

A liquid diorganopolysiloxane, referred to as the Siloxane-X hereinbelow, was prepared in substantially the same manner as in Example 1 by the reaction of 100 g of a silanol-terminated dimethylpolysiloxane having a viscosity of 21,000 centistokes and containing 0.0116 mole/100 g of silanolic terminal hydroxy groups as expressed by the formula HO—SiPh₂—O—SiMe₂—O—SiMe₂—O)₅₀ H and 10.86 g of the alkenylcontaining aminosiloxane compound prepared in Example 1. The resultant diorganopolysiloxane had a viscosity of 16,000 centistokes and could be identified by the infrared and NMR absorption spectral analyses to be a compound expressed by the following structural formula:

Me₃S—O—SiMeVi—O)₉
—SiPh-
₂—O—SiMe₂—O—SiMe₂—O—SiMe₂—O)₅₀
—SiMeVi—O)₉ SiMe₃.

Figure 7:
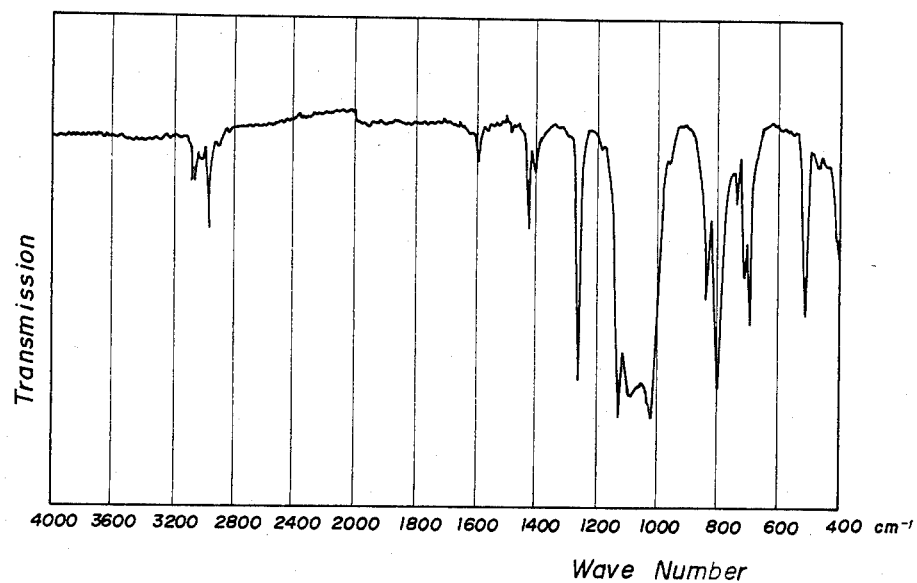

The infrared absorption spectrum of the Siloxane-X is shown in FIG. 7 and the result of the NMR analysis was:
δ0.04 assignable to the hydrogen atoms in the Si—Me groups;
δ5.3 to 6.6 assignable to the hydrogen atoms in the Si—Vi groups; and
δ7.1 to 7.7 assignable to the hydrogen atoms in the Si—Ph groups.

The thus prepared Siloxane-X was admixed with cross-linking agents to give a curable organopolysiloxane composition, referred to as the Composition 18 hereinbelow, according to the formulation shown below.

| Composition 18: | |
|---|---|
| Siloxane-X | 100 parts |
| Methylhydrogenpolysiloxane having 1.15 mole/100 g of silicon-bonded hydrogen atoms | 8.24 parts |
| n-Hexyl alcohol solution of chloroplatinic acid in a concentration of 2% by weight as platinum | 0.1 part |

The composition 18 prepared according to the above shown formulation was shaped into a sheet of 2 mm thickness which was heated at 150° C. for 3 hours to give a cured rubber sheet, referred to as the Sheet-XVIII hereinbelow, and it was subjected to the measurement of the mechanical properties to give the following results: hardness, JIS 62; tensile strength 15 kg/cm²; and ultimate elongation 50%.

EXAMPLE 8

A liquid diorganopolysiloxane, referred to as the Siloxane-XI hereinbelow, was prepared in substantially the same manner as in Example 1 by the reaction of 100 g of a silanol-terminated organopolysiloxane having a viscosity of 1,500 centistokes and containing 0.0129 mole/100 g of silanolic terminal hydroxy groups as expressed by the formula HO—SiMeEt₂O)₁₉ (SiPh₂—O)₉ (SiMe₂ —O)₁₆₂ H and 11.49 g of alkenyl-containing aminosiloxane compound prepared in Example 1. The resultant diorganopolysiloxane had a viscosity of 1,800 centistokes and could be identified by the infrared and NMR absorption spectral analyses to be a compound expressed by the following structural formula:

Me₃Si—O—SiMeVi—O)₉ (SiMeEt13 O)₁₉
(SiPh₂—O)₉
SiMe₂—O)₁₆₂ (—SiMeVi—O)₉ SiMe₃.

Figure 8:
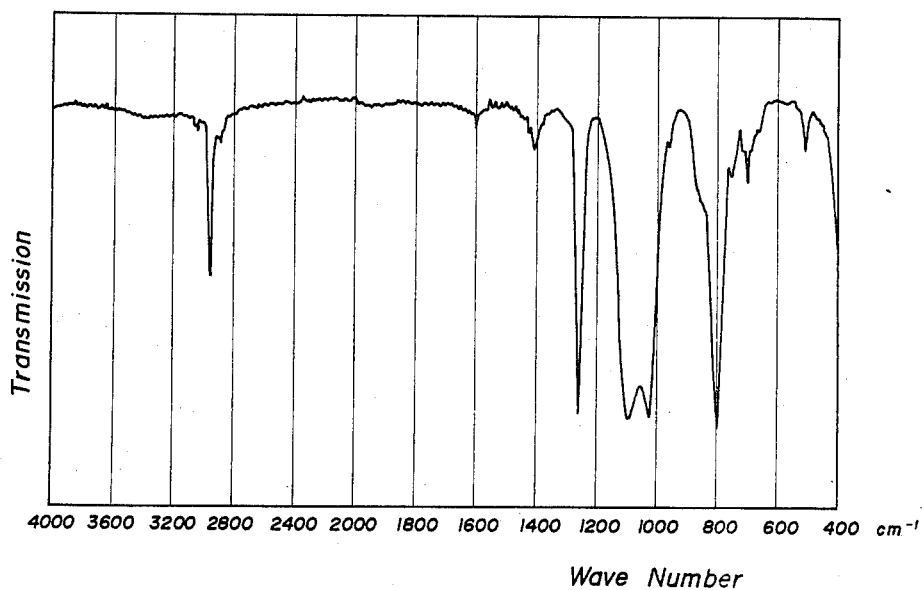

The infrared absorption spectrum of the Siloxane-XI is shown in FIG. 8 and the result of the NMR analysis was:

$\delta$ 0.04 assignable to the hydrogen atoms in the Si—Me groups;

$\delta$ 0.3 to 1.1 assignable to the hydrogen atoms in the Si—Et groups; and $\delta$ 7.1 to 7.7 assignable to the hydrogen atoms in the Si—Ph groups.

The thus prepared Siloxane-XI was admixed with crosslinking agents to give a curable organopolysiloxane composition, referred to as the Composition 19 hereinbelow, according to the formulation shown below.

| Composition 19: | |
|---|---|
| Siloxane-XI | 100 parts |
| Methylhydrogenpolysiloxane having 0.52 mole/100 g of silicon-bonded hydrogen atoms | 19.86 parts |
| n-Hexyl alcohol solution of chloroplatinic acid in a concentration of 2% by weight as platinum | 0.1 part |

The Composition 19 prepared according to the above shown formulation was shaped into a sheet of 2 mm thickness which was heated at 150° C. for 3 hours to give a cured rubber sheet, referred to as the Sheet-XIX hereinbelow, and it was subjected to the measurement of the mechanical properties to give the following results: hardness, JIS 60; tensile strength 46 kg/cm²; and ultimate elongation 80%.

We claim:

1. An organopolysiloxane represented by the general structural formula $(R_a{}^3, R_b{}^4)Si—O—SiR^1R^2—O]_m$
$[—SiR^5R^6—O—]_n —[—SiR^1R^2—O—]_m Si(R_a{}^3, R_b{}^4)$, in which $R^1$ is a vinyl group, $R^2$ is a methyl group, $R^3$ and $R^4$ are each a monovalent hydrocarbon group, $R^5$ and $R^6$ are each monovalent hydrocarbon groups free from aliphatic unsaturation, a+b are each zero or a positive integer not exceeding 3 with the proviso that a+b is 3, m is a positive integer of at least 3 and n is a positive integer of at least 6, the —SiR¹R²—O— units included within the square brackets including m units being connected together in an uninterrupted sequence and bonded directly to the terminal triorganosiloxy unit $(R_a{}^3, R_b{}^4)SiO—$.

2. A method for the preparation of an organopolysiloxane represented by the general structural formula

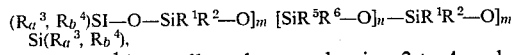

in which $R^1$ is an alkenyl group having 2 to 4 carbon atoms, $R^2$ and $R^3$ are each a monovalent hydrocarbon group, $R^4$, $R^5$ and $R^6$ are each a monovalent hydrocarbon group, a and b are each zero or a positive integer not exceeding 3 with the proviso that a + b is 3, m is a positive integer of at least 3 and n is a positive integer of at least 6, the —SiR¹R²—O— units included within the square brackets including m units being connected together in an uninterrupted sequence and bonded directly to the terminal triorganosiloxy units $(R_a{}^3, R_b{}^4)SI—$, which comprises reacting:

(1) an organopolysiloxane having, in a molecule, at least one siloxane unit of the formula $(—SiR^1R^2—O—)_3$, in which $R^1$ and $R^2$, each have the same meaning as defined above, at least one triorganosilyl group of the formula $(R_a{}^3, R_b{}^4)Si—$, in which $R^3$ and $R^4$ each have the same meaning as defined above, and one and only one silylamine group of the formula $SiNR_2{}^7$ or silazane group , in which $R^7$ s a hydrogen atom or a monovalent hydrocarbon group; and (2) a linear diorganopolysiloxane having a viscosity not exceeding 100,000 centipoise at 25° C. terminated at both molecular chain ends each with a silanolic hydroxy group as expressed by the general formula $HOSiR^5R^6—O)_nH,$ in which $R^5$, $R^6$ and n each have the same meaning as defined above.

3. The method as claimed in claim 2 wherein the reactant (1) is a diorganopolysiloxane terminated at one of the molecular chain ends with the group $R_a{}^3R_b{}^4Si—$ and at the other with the group $SiNR_2{}^7$.

4. A curable organopolysiloxane composition which comprises: (a) an organopolysiloxane represented by the general structural formula

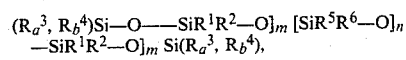

in which $R^1$ is an alkenyl group having 2 to 4 carbon atoms, $R^2$ and $R^3$ are each a monovalent hydrocarbon group, $R^4$, $R^5$ and $R^6$ are each a monovalent hydrocarbon group, a and b are each zero or a positive integer not exceeding 3 with the proviso that a +b is 3, m is a positive integer of at least 3 and n is a positive integer of at least 6, the —SiR¹R²—O—l units included within the square brackets including m units being connected together in an uninterrupted sequence and bonded directly to the terminal triorganosiloxy unit $(R_a{}^3, R_b{}^4)SiO—$; and (b) a crosslinking agent.

5. The curable organopolysiloxane composition as claimed in claim 4 wherein the crosslinking agent is a combination of an organopolysiloxane having at least two mercaptoalkyl groups in a molecule and a photosensitizer.

6. The curable organopolysiloxane composition as claimed in claim 4 wherein the crosslinking agent is a combination of an organohydrogenpolysiloxane having at least two hydrogen atoms directly bonded to the silicon atoms in a molecule and a catalytic amount of a platinum compound.

7. The curable organopolysiloxane composition as claimed in claim 4 wherein the crosslinking agent is an organic peroxide.

* * * * *

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 2, line 36, the formula reading:

should read:

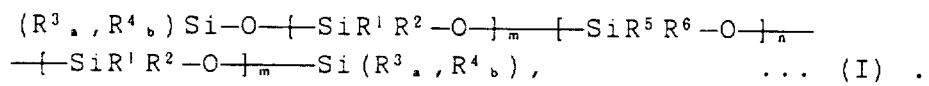

Column 3, line 7, the formula reading:

should read:

Column 3, line 61, the formula reading:

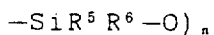

should read:

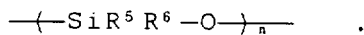

Column 4, the first formula reading:

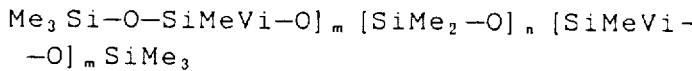

should read:

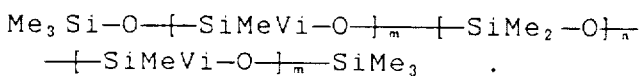

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

It is certified that error appears in the above-identified patent and that said Letters Patent is hereby corrected as shown below:

Column 4, the second formula reading:
$$Me_3Si-O-SiMeAl-O]_m[SiMe_2-O]_n-[SiMeAl-O]_m SiMe_3$$
should read:
$$Me_3Si-O-[-SiMeAl-O-]_m-[-SiMe_2-O-]_n-[-SiMeAl-O-]_m-SiMe_3 \ .$$

Column 4, the third formula reading:
$$Me_2ViSi-O-SiMeVi-O]_m[SiMe_2-O]_n[SiMeVi-O]_m SiMe_2Vi$$
should read:
$$Me_2ViSi-O-[-SiMeVi-O-]_m-[-SiMe_2-O-]_n-[-SiMeVi-O-]_m-SiMe_2Vi \ .$$

Column 4, the fourth formula reading:
$$Me_3Si-O'SieVi-O\ [_m\ [SiEt_2-O]_n [SiMeVi-O]_m SiMe_3$$
should read:
$$Me_3Si-O-[-SiMeVi-O-]_m-[-SiEt_2-O-]_n-[-SiMeVi-O-]_m-SiMe_3 \ .$$

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

It is certified that error appears in the above-identified patent and that said Letters Patent is hereby corrected as shown below:

Column 4, the fifth formula reading:
$$Me_3Si-O-SiMeVi-O]_m[SiMePh-O]_n$$
$$[SiMeVi-O]_m SiMe_3$$

should read:

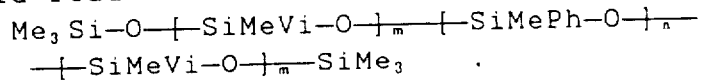

Column 4, the sixth formula reading:
$$Me_3Si-O-SiMeVi-O_m$$
$$[(-SiMe_2-O)_p(SiPh_2-O)_q]_n$$
$$SiMeVi-O]_m SiMe_3$$

should read:
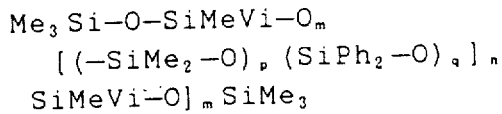
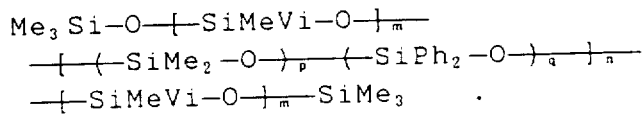

Column 4, the seventh formula reading:
$$Me_3Si-O-SiMeVi-O]_m$$
$$SiMePf-)]_n[SiMeVi-O]_m SiMe_3$$

should read:
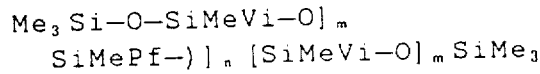
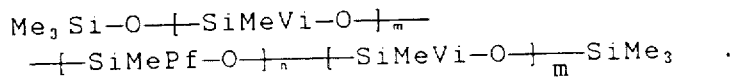

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 4, the eighth formula reading:
   Me$_3$Si—O—SiMeVi—O]$_m$ [SiMeEt—O]$_n$
      [SiMeVi—O]$_m$SiMe$_3$
should read:

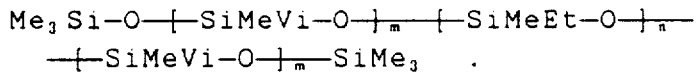

Column 4, the ninth formula reading:
   Me$_3$Si—O—SiMeVi—$_m$ [(—SiMeEt—O)$_p$,
      (SiPh$_2$—O)$_q$—SiMe$_2$—O)$_r$,]$_n$ [SiMeVi—O]$_m$
      SiMe$_3$
should read:
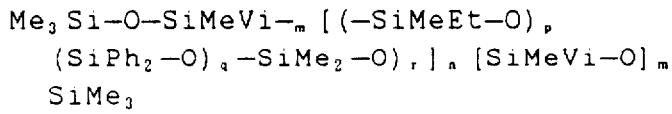
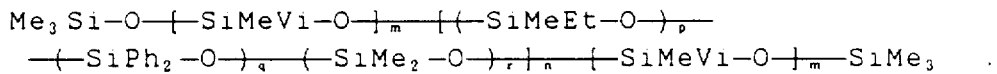

Column 4, line 36, the formula reading:
   R$^3$R$^4$Si—O—SiR$^1$R$^2$)$_3$]$_m$ [O—SiR$_2^2$)$_3$]$_n$NR$_2^7$
should read:
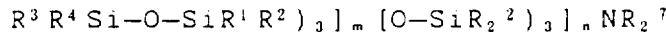

Column 4, line 37, the formula reading:
   (R$_3$'Si—O—SiR$^1$R$^2$)$_3$]$_m$O—SiR$_2^2$)$_3$]$_n$}$_2$NR$^7$
should read:

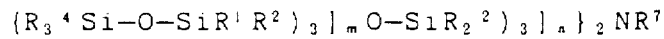

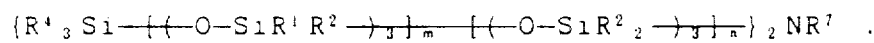

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 4, line 42, the formula reading:

$$R_3{}^4Si-O-SiR^1R^2-O)_3]_m-SiR_2{}^2-O)_3]_nSiR_2{}^2-NR_2{}^7$$

should read:

$$R^4{}_3Si-O-[(-SiR^1R^2-O-)_3]_m-[(-SiR^2{}_2-O-)_3]_n-SiR^2{}_2--NR^7{}_2 \ .$$

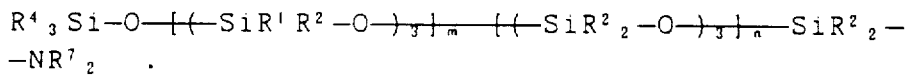

Column 4, line 52, the formula reading $LiNR_2{}^7$ should read $LiNR^7{}_2$.

Column 4, line 60, the formula reading $R_2{}^2Si(NR_2{}^7)_2$ should read $R^2{}_2Si(NR^7{}_2)_2$.

Column 7, line 5, the reaction equation reading:

$$LiNMe_2 + n(-SiMeVi-O-)_3 \rightarrow Me_2N-SiMeVi--)_{3n}Li$$

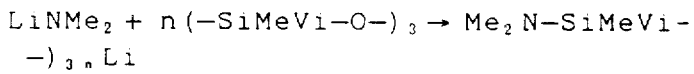

should read:

$$LiNMe_2 + n(-SiMeVi-O-)_3$$
$$\rightarrow Me_2N-[-SiMeVi-O-]_{3n}-Li \ .$$

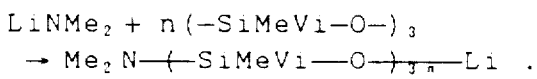

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 7, line 8, the reaction equation reading:
   Me$_2$N—SiMeVi—O)$_3$$_n$
   Li+ Me$_3$SiCl→ Me$_2$N—SiMeVi—O)$_3$$_n$SiMe$_3$
shoud read:
   Me$_2$N—(—SiMeVi—O—)$_{3n}$—Li+ Me$_3$SiCl
   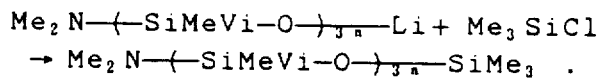
   → Me$_2$N—(—SiMeVi—O—)$_{3n}$—SiMe$_3$ .

Column 7, line 15, the formula reading:
   Me$_2$N—SiMeVi—O)$_9$SiMe$_3$
should read:
   Me$_2$N—(—SiMeVi—O—)$_9$—SiMe$_3$ .
   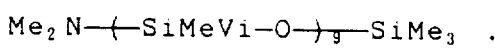

Column 7, line 37, the formula reading:
   Me$_3$Si—(—O—SiMeVi)$_9$     —O—SiMe$_2$)$_{400}$
   (—O—SiMeVi—)$_9$O—SiMe$_3$
should read:
   Me$_3$Si—(—O—SiMeVi—)$_9$—(—O—SiMe$_2$—)$_{400}$—
   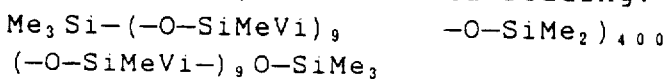
   —(—O—SiMeVi—)$_9$—O—SiMe$_3$ .
   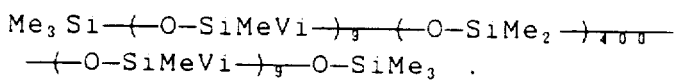

Column 8, line 36, the formula reading:
   HO—SiMe$_2$—O)$_{235}$H
   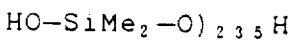
should read:
   HO—(—SiMe$_2$—O—)$_{235}$—H;
   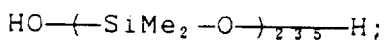

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

Page 7 of 14

It is certified that error appears in the above-identified patent and that said Letters Patent is hereby corrected as shown below:

Column 8, line 44, the formula reading:
$Me_3SiO-SiMeVi)_9(O-SiMe_2)_{235}(-O-SiMeVi)_9 O-SiMe_3$
should read:
$Me_3Si-(-O-SiMeVi-)_9-(-O-SiMe_2-)_{235}-(-O-SiMeVi-)_9-O-SiMe_3$ .

Column 9, line 40, the formula reading:
$HO-SiMe_2-O)_{600}H$
should read:
$HO-(-SiMe_2-O-)_{600}-H$ .

Column 9, line 47, the formula reading:
$Me_3Si-O-SiMeVi)_9(-O-SiMe_2)_{600}(-O-SiMe-Vi)_9O-SiMe_3$
should read:
$Me_3Si-(-O-SiMeVi-)_9-(-O-SiMe_2-)_{600}-(-O-SiMeVi-)_9-O-SiMe_3$ .

Column 10, line 41, the formula reading:
$Me_3Si-O-SiMeVi)_{15}NME_2$
should read:
$Me_3Si-(-O-SiMeVi-)_{15}-NMe_2$ .

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 10, line 54, the formula reading:
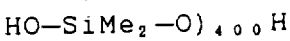
should read:
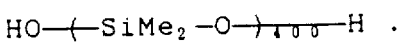

Column 10, line 61, the formula reading:
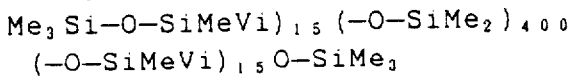
should read:
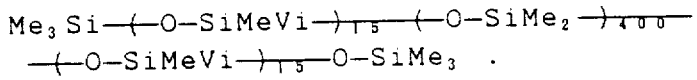

Column 12, line 32, the formula reading:
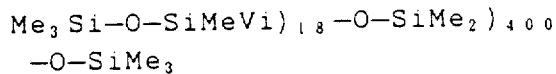
should read:
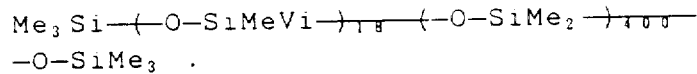

Column 12, line 63, the formula reading:
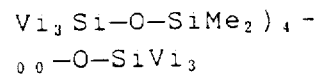
should read:
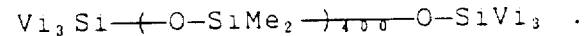

UNITED STATES PATENT AND TRADEMARK OFFICE
CERTIFICATE OF CORRECTION

PATENT NO. : 4,683,320

DATED : July 28, 1987

INVENTOR(S) : Yoshinori Iida et al.

It is certified that error appears in the above-identified patent and that said Letters Patent is hereby corrected as shown below:

Column 14, line 9, the reaction equation reading:

$$Me_3SiOH + n(-SiMeVi-O-)_3 \rightarrow Me_3iO-SiMeVi--O-)_{3n}H$$

should read:

$$Me_3SiOH + n(-SiMeVi-O-)_3 \rightarrow Me_3SiO(-SiMeVi-O-)_{3n}H \ .$$

Column 14, line 11, the reaction equation reading:

$$Me_3SiO-SiMeVi-O)_{3n}H + Me_2SiCl_2 + t_3N \rightarrow Me_3SiO-SiMeVi-O)_{3n}SiMe_2Cl + Et_3N \cdot HCl$$

shoud read:

$$Me_3SiO(-SiMeVi-O-)_{3n}H + Me_2SiCl_2 + Et_3N \rightarrow Me_3SiO(-SiMeVi-O-)_{3n}SiMe_2Cl + Et_3N \cdot HCl \ .$$

Column 14, line 14, the reaction equation reading:

$$Me_3SiO-SiMeVi-O)_{3n}SiMe_2Cl + NH_3 \rightarrow Me_3SiO-SiMeVi-O)_{3n}SiMe_2NH_2 \rightarrow [Me_3SiO-SiMeVi-O)_{3n}SiMe_2-]_2NH$$

should read:

$$Me_3SiO(-SiMeVi-O-)_{3n}SiMe_2Cl + NH_3 \rightarrow Me_3SiO(-SiMeVi-O-)_{3n}SiMe_2NH_2 \rightarrow [Me_3SiO(-SiMeVi-O-)_{3n}SiMe_2-]_2NH \ .$$

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 14, line 22, the formula reading:
  $Me_3SiO-SiMeVi-O)_9SiMe_2NH_2$
should read:
  $Me_3SiO-(-SiMeVi-O-)_9-SiMe_2NH_2$ .

Column 14, line 24, the formula reading:
  $[Me_3SiO-SiMeVi-O)_9SiMe_2-]_2NH$
should read:
  $[Me_3SiO-(-SiMeVi-O-)_9-SiMe_2-]_2NH$ .

Column 14, line 41, the formula reading:
  $Me_3Si-O-SiMeVi)_9-O-SiMe_2)_{400}$
  $-O-SiMeVi)_9O-SiMe_3$
should read:
  $Me_3Si-(-O-SiMeVi-)_9-(-O-SiMe_2-)_{400}-$
  $-(-O-SiMeVi-)_9-O-SiMe_3$ .

Column 15, line 7, the formula reading:
  $Me_3Si-O-SiMeAl)_9NMe_2$
should read:
  $Me_3Si-(-O-SiMeAl-)_9-NMe_2$ .

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

It is certified that error appears in the above-identified patent and that said Letters Patent is hereby corrected as shown below:

Column 15, line 20, the formula reading:
$$HO-SiMe_2O)_{400}H$$
should read:
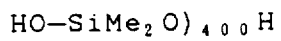 .

Column 15, line 28, the formula reading:
$$Me_3Si-O-SiMeAl)_9 (-O-SiMe_2{}_{400}$$
$$-O-SiMeAl)_9 O-SiMe_3$$
should read:
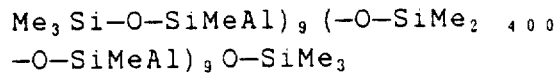
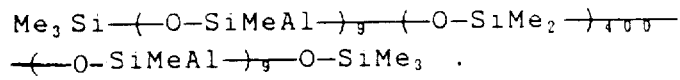 .

Column 16, line 2, the formula reading:
$$HO-SiPh-_2-O-SiMe_2-O-SiMe_2-O)_{50}H$$
should read:
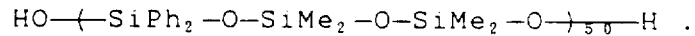 .

Column 16, line 11, the formula reading:
$$Me_3S-O-SiMeVi-O)_9$$
$$-SiPh-$$
$$_2-O-SiMe_2-O-SiMe_2-O-SiMe_2-O)_{50}$$
$$-SiMeVi-O)_9 SiMe_3$$
should read:
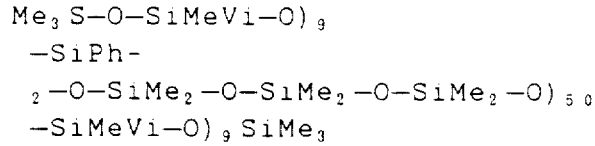
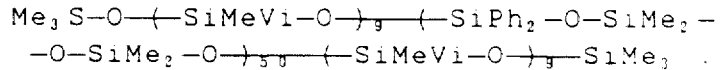 .

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

It is certified that error appears in the above-identified patent and that said Letters Patent is hereby corrected as shown below:

Column 16, line 57, the formula reading:
$$HO-SiMeEt_2O)_{19}(SiPh-_2-O)_9(SiMe_2-O)_{162}H$$
should read:
$$HO-(-SiMeEt_2O-)_{19}-(-SiPh_2-O-)_9--(-SiMe_2-O-)_{162}-H.$$

Column 16, line 65, the formula reading:
$$Me_3Si-O-SiMeVi-O)_9(SiMeEt13O)_{19}$$
$$(SiPh_2-O)_9$$
$$SiMe_2-O)_{162}(-SiMeVi-O)_9SiMe_3$$
should read:
$$Me_3Si-O-(-SiMeVi-O-)_9-(-SiMeEt-O-)_{19}--(-SiPh_2-O-)_9-(-SiMe_2-O-)_{162}-(-SiMeVi--O-)_9-SiMe_3.$$

Column 17, line 36, the formula reading:
$$(R_a^3,R_b^4)Si-O-SiR^1R^2-O13]_m$$
$$[-SiR^5R^6-O-]_n-[-SiR^1R^2-O-]_mSi(R_a^3,R_b^4)$$
should read:
$$(R^3{}_a,R^4{}_b)Si-O-(-SiR^1R^2-O-)_m--(-SiR^5R^6-O-)_n-(-SiR^1R^2-O-)_m-Si(R^3{}_a,R^4{}_b).$$

Column 17, line 49, the terminal triorganosiloxy unit reading $(R_a^3,R_b^4)SiO-$ should read $(R^3{}_a,R^4{}_b)SiO-$.

UNITED STATES PATENT AND TRADEMARK OFFICE
CERTIFICATE OF CORRECTION

PATENT NO. : 4,683,320

DATED : July 28, 1987

INVENTOR(S) : Yoshinori Hida et al.

It is certified that error appears in the above-identified patent and that said Letters Patent is hereby corrected as shown below:

Column 17, line 52, the formula reading:
$$(R_a{}^3, R_b{}^4)SI-O-SiR^1R^2-O]_m [SiR^5R^6-O]_n -SiR^1R^2-O]_m Si(R_a{}^3, R_b{}^4)$$
should read:
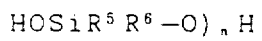
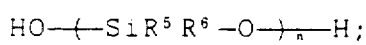

Column 18, line 3 the terminal triorganosiloxy unit reading $(R_a{}^3, R_b{}^4)SI-$ should read $(R^3{}_a, R^4{}_b)SiO-$.

Column 18, line 9, the formula reading $(R_a{}^3, R_b{}^4)Si-$ should read $(R^3{}_a, R^4{}_b)Si-$.

Column 18, line 20, the formula reading:
$$HOSiR^5R^6-O)_n H$$
should read:
$$HO-\!\!\left[-SiR^5R^6-O-\right]_n\!\!-H;$$

UNITED STATES PATENT AND TRADEMARK OFFICE
CERTIFICATE OF CORRECTION

PATENT NO. : 4,683,320
DATED : July 28, 1987
INVENTOR(S) : Yoshinori Hida et al.

It is certified that error appears in the above-identified patent and that said Letters Patent is hereby corrected as shown below:

Column 18, line 26, the formula reading $(R_a{}^3 R_b{}^4 Si-$ should read $(R^3{}_a R^4{}_b Si-$.

Column 18, line 32, the formula reading:
$$(R_a{}^3, R_b{}^4)Si-O-SiR^1R^2-O]_m [SiR^5R^6-O]_n -SiR^1R^2-O]_m Si(R_a{}^3, R_b{}^4)$$
should read:
$$(R^3{}_a, R^4{}_b)Si-O-[-SiR^1R^2-O-]_m --[-SiR^5R^6-O-]_n -[-SiR^1R^2-O-]_m -Si(R^3{}_a, R^4{}_b) .$$

Column 18, line 45, the terminal triorganosiloxy unit reading $(R_a{}^3, R_b{}^4)SiO-$ should read $(R^3{}_a, R^4{}_b)SiO-$.

Signed and Sealed this

Eighteenth Day of July, 1989

Attest:

DONALD J. QUIGG

Attesting Officer    Commissioner of Patents and Trademarks